United States Patent [19]
Carpenter et al.

[11] Patent Number: 6,121,169
[45] Date of Patent: Sep. 19, 2000

[54] POROUS INTERFACIAL COATING FOR FIBER REINFORCED CERAMIC MATRIX COMPOSITES

[75] Inventors: Harry Wellington Carpenter, Fallbrook; David Eric Daws, Long Beach; Nicholas T. Castellucci, Lomita, all of Calif.

[73] Assignee: Northrop Grumman Corporation, Los Angeles, Calif.

[21] Appl. No.: 09/033,747

[22] Filed: Feb. 24, 1998

[51] Int. Cl.$^7$ .............................. B32B 17/07; B32B 17/10
[52] U.S. Cl. .................... 442/180; 428/293.4; 428/294.1
[58] Field of Search ................ 442/52, 180; 156/89.15, 156/155, 89.25; 428/296.4, 293.4, 294.1

[56] References Cited

U.S. PATENT DOCUMENTS

| | | | |
|---|---|---|---|
| 4,842,933 | 6/1989 | Cizmecioglu | 428/378 |
| 5,039,635 | 8/1991 | Stempin et al. | 501/95.2 |
| 5,258,084 | 11/1993 | Leung et al. | 156/89.26 |
| 5,266,533 | 11/1993 | Leung et al. | 501/12 |
| 5,322,555 | 6/1994 | Leung et al. | 106/18.12 |
| 5,334,414 | 8/1994 | Edie et al. | 427/189 |
| 5,340,777 | 8/1994 | Leung et al. | 501/12 |

Primary Examiner—Terrel Morris
Assistant Examiner—John J. Guarriello
Attorney, Agent, or Firm—Terry J. Anderson; Karl J. Hoch, Jr.

[57] ABSTRACT

The present invention is embodied in ceramic matrix composites with porous interfacial coatings and the methods and processes for fabricating such coatings integral with the ceramic matrix composites. Each ceramic matrix composite of the present invention includes a fibrous substrate or fabric material with a porous interfacial coating. The coating, prior to processing, is comprised of a coating solution made of a carbon precursor and a ceramic precursor resin dissolved directly within a solvent or solvents. Fabrication is achieved by first desizing the fibrous substrate, second immersing the desized fibrous substrate in the mixed coating solution, third evaporating the solvent and curing the precursor and resin via a low temperature cure, and fourth pyrolyzing the coating via a high temperature pyrolysis, preferably in an inert atmosphere. Next, the coated fibrous substrate is combined with a ceramic matrix composite (CMC). Last the coated fibrous substrate/CMC system is oxidized to remove the carbon particulates within the coating via high temperature air exposure to produce a CMC material with a porous interfacial coating.

14 Claims, 2 Drawing Sheets

POROUS INTERFACIAL COATING FOR FIBER REINFORCED CERAMIC MATRIX COMPOSITES

BACKGROUND OF THE INVENTION

1. Field of the Invention.

The present invention relates in general to ceramic matrix composites, and in particular to a porous interfacial coating for fiber reinforced ceramic matrix composites and the methods and processes for fabricating such a coating on the ceramic matrix composite.

2. Related Art.

Ceramic matrix composites (CMCs) show considerable promise for primary and secondary structural applications for both commercial and military applications due to their low density and high temperature performance. For example, CMC's are useful for many applications because they possess high-temperature mechanical performance and exhibit a high strain-to-failure compared to monolithic ceramics. In order to achieve high strains-to-failure, many CMC systems require an interfacial coating between the fibrous reinforcement material and the ceramic matrix. Thus, interfacial coatings are becoming increasingly desirable for use with ceramic matrix composites (CMC's).

The interfacial coating is usually applied via chemical vapor deposition (CVD), sputtering, or evaporation, and provides a weak bond between the fiber and matrix that allows fiber "pullout" (ductile shear movement instead of brittle fracture) during tensile stress application. In other words, the interfacial coating creates a weak disbond layer between the ceramic matrix and fibers, thereby imparting desired ductile qualities to the final CMC.

Controlling the fiber-matrix interface of CMCs through appropriate fiber coatings is often critical to achieving high failure strengths and strains. Fiber coatings must be carefully chosen to produce the weak bond between the fiber and the surrounding ceramic matrix material to allow the fiber pullout. Carbon and boron nitride are presently the most popular interface coatings for CMCs. However, due to catastrophic oxidation, carbon is only effective to 800° F. and boron nitride only to 1000° F. To realize the full potential of CMC materials, where the ceramic fibers and ceramic matrix materials are often effective to temperatures greater than or equal to 2000° F., fiber interface coatings must be identified that will remain effective even at these high temperatures.

However, current interfacial coatings have several limitations. First, making parts or fabrics that are coated via CVD, sputtering, or evaporation are limited in size to the internal capacity of the CVD furnace or sputtering/evaporation chamber. Also, coating uniformity is usually difficult to achieve due to line-of-sight masking during coating application. In addition, chemical vapor deposition is usually very expensive, with the cost to coat 1 square yard of fabric ranging from $2000 to $10,000, depending on the coating to be applied. Moreover, the gases used during chemical vapor deposition can be hazardous, such as boron trichloride and ammonia for deposition of boron nitride coatings.

Therefore, what is needed is a porous interfacial coating for fiber reinforced ceramic matrix composites. What is also needed is a ceramic matrix composite with a porous interfacial coating that does not have compatibility problems with the base matrix material. What is further needed is a method to apply such a porous interfacial coating to fibers that reinforce ceramic matrix composites.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in ceramic matrix composites with porous interfacial coatings and the methods and processes for fabricating such coatings integral with the ceramic matrix composites.

Each ceramic matrix composite of the present invention includes a fibrous substrate or fabric material with a porous interfacial coating on the individual fibers. The coating, prior to processing, is comprised of a coating solution made of a ceramic precursor and an organic resin dissolved directly within a suitable solvent. Fabrication is achieved by first desizing the fibrous substrate, second immersing the desized fibrous substrate in the coating solution, third evaporating the solvent and curing the precursor and resin coating mixture via a low temperature cure, and fourth pyrolyzing the coating via a high temperature pyrolysis in an inert atmosphere.

Next, the coated fibrous substrate is combined with a ceramic matrix material to form a ceramic composite matrix (CMC). Last the coated fibrous substrate/CMC system is a oxidized via high temperature air exposure to produce a CMC material with a porous interfacial coating. The first four steps can be repeated as necessary and/or the concentration of the resin/precursor constituents can be varied, depending on the desired final thickness of the porous coating. Also, a higher organic resin concentration can be used to increase the porosity of the coating. In addition, the coating can be made using the base matrix material of the CMC. For example, if the base matrix material of the CMC BLACKGLAS ceramic precursor, a BLACKGLAS precursor can used as the ceramic precursor for the porous coating solution.

A feature of the present invention is that a uniform solidified coating exists around the individual substrate fibers. Another feature of the present invention is that the coating can have a ceramic precursor material made of the same material as the base matrix material of the CMC to create a perfect match in the coefficients of thermal expansion between the CMC and coating. An additional feature of the present invention is that the porous coating is resistant to oxidation. Yet another feature of the present invention is that the final coating thickness can be varied. An advantage of the present invention is that coating uniformity is enhanced. Other advantages of the present invention are the low cost of raw materials, low labor intensity, and elimination of the need for expensive coating equipment.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
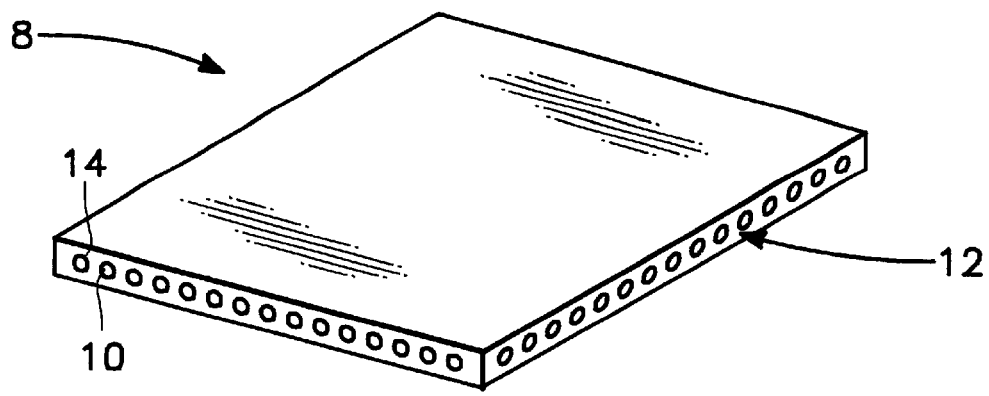
FIG. 1 is a perspective view of a ceramic matrix composite of the present invention with a porous interfacial fiber coating.

FIG. 1 is a perspective view of the present invention. The present invention is a ceramic matrix composite panel 8 having a plurality of fibers 10 defining a fibrous substrate 12. Each fiber 10 of the fibrous substrate 12 is coated with a porous interfacial coating 14 in accordance with the present invention. The fibrous substrates 12 can be any fibrous material or sheet capable of enduring the fabrication process detailed below, which includes fiberglass, quartz, and most ceramic fibers.

Component Description

Figure 2:
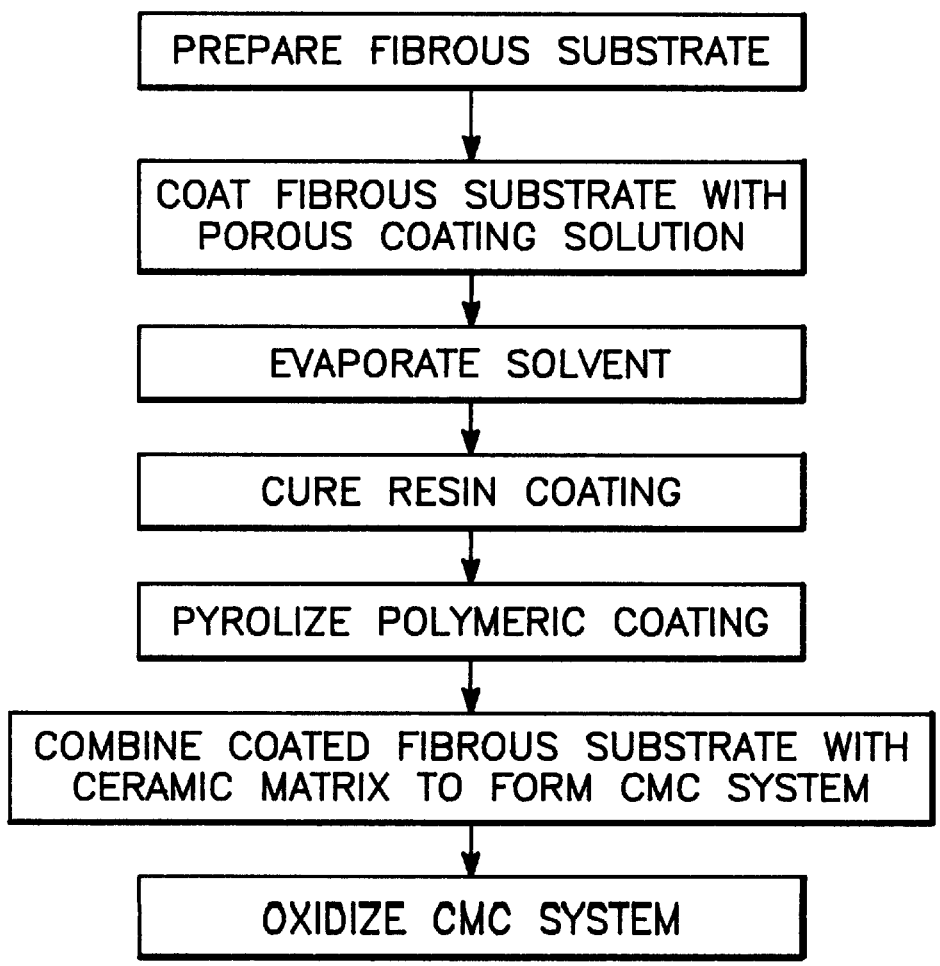
FIG. 2 is a flow chart illustrating the general steps for fabricating the porous interfacial coating in accordance with the present invention.
Figure 3:
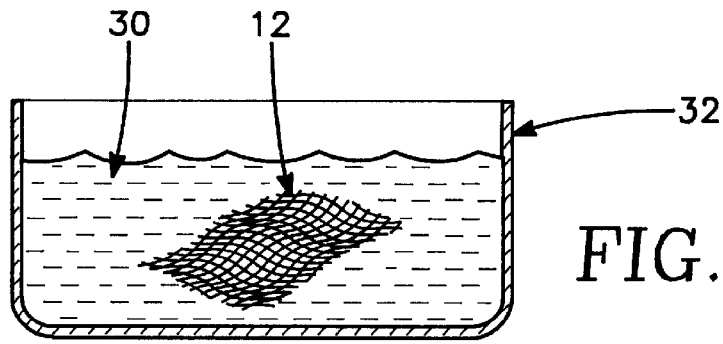
FIG. 3 is a cross-sectional side view of the present invention during one of the processing steps.

FIG. 2 is a flow chart illustrating the general steps for fabricating the ceramic matrix composite material in accordance with the present invention. Referring to FIGS. 1–3, first, the fibrous substrate 12 (fabric, tow, or sheet material) is initially prepared. Initial preparation can include, for example, removing the protective fabric sizing (desizing) via a high temperature heat clean or immersing the fibrous substrate 12 in an appropriate desizing solvent. Desizing the fibrous substrate 12 is required to prevent the sizing from interfering with effective application, wetting, and adherence of the coating to the fibrous substrate 12. This is important to ensure a uniform coating that adheres well to the fibers after completion of processing.

Second, the fibrous substrate 12 is coated with a coating solution 30 (the porous interfacial coating 14 of FIG. 1 before processing). FIG. 3 is a cross-sectional side view of the preferred method of accomplishing this step. As shown in FIG. 3, the fibrous substrate 12 is coated with the coating solution 30 by preferably immersing the desized fiber substrate 12 within a container 32 having the coating solution 30 until complete wetting is achieved. Complete wetting provides direct application of the coating solution to the fibrous substrate. This is important because it ensures a uniform application around the substrate fibers. It should be noted that other methods of wetting the fibrous substrate 12 can be used, such as, solution spraying or mechanically drawing tow material through a bath of the solution.

The porous interfacial coating solution 30 is comprised of at least a ceramic precursor, an organic resin and a suitable solvent. The precursor and resin are dissolved directly within the solvent or solvents. A dual or a single solvent coating solution can be used. For example, a siloxane precursor and a carbon resin can be combined with a single solvent to form a single solvent coating solution. Alternatively, a siloxane precursor can be combined with one solvent to form a first mixture and a carbon resin can be combined with another solvent to form a second mixture. The two mixtures can then be combined to form a dual solvent coating solution, assuming the two solvents are mutually compatible.

The precursor and resin can be any suitable precursor and resin, such as a BLACKGLAS ceramic precursor or a Phenolic carbon resin, or a combination of both, depending on the base matrix material of the CMC to be coated. The solvent can be any suitable solvent, such as isopropyl alcohol (IPA), iso-octane, a butanone (xylene with 10–20% methyl ethyl ketone) solvent, 2-butanone (MEK), xylene solvent, and the like.

Figure 4:
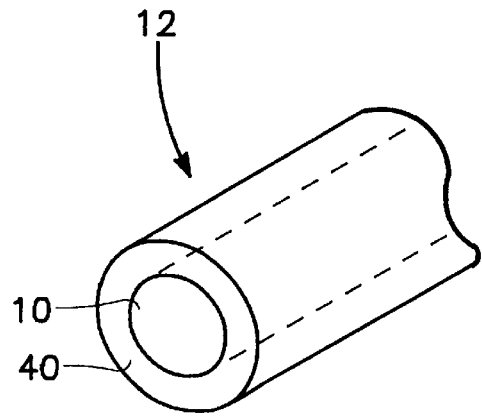
FIG. 4 is a cross-sectional side view of the present invention during one of the processing steps.

Third, the solvent of the coating solution is evaporated by air-drying the fibrous substrate 12. For example, any suitable room temperature air-dry system can be used to evaporate the solvent. Fourth, the precursor and resin of the coating are cured via a low temperature cure. This step creates a uniform solidified coating 40 around each fiber 10 of the fibrous substrate 12, as shown in FIG. 4. A vacuum oven can be used at low temperatures to cure the precursor and resin of the coating solution 30 on the fibrous substrate 12. It should be noted that this curing step merely solidifies the precursors through cross-linking of the precursor polymers.

Figure 5:
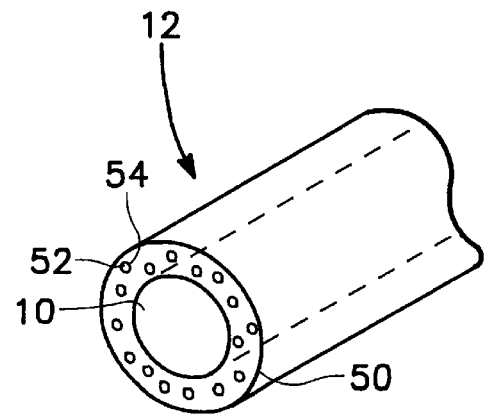
FIG. 5 is a cross-sectional side view of the present invention during one of the processing steps.

Fifth, the uniform solidified coating 40 of FIG. 4 is converted into a multi-phase ceramic coating 50, as shown in FIG. 5. This can be achieved with a typical pyrolyzation process, such as a high temperature pyrolysis utilizing an inert atmosphere. For example, the coated fibers 10 of the fibrous substrate 12 can be subjected to high heat treatment within a furnace (not shown). This step converts the uniform solidified coating to a multi-phase ceramic coating 50. The coating 50 comprises carbonaceous particles 52 within a ceramic 54. For example, if BLACKGLAS ceramic precursor was used as the precursor and a carbon-based material was used as the resin, the particles 52 would be carbon particles and the cured ceramic 54 would be a siloxane ceramic ($SiO_xC_y$). The second, third, fourth, and fifth steps can be repeated as necessary, depending on the desired thickness of the coating (applications discussed below).

Figure 6:
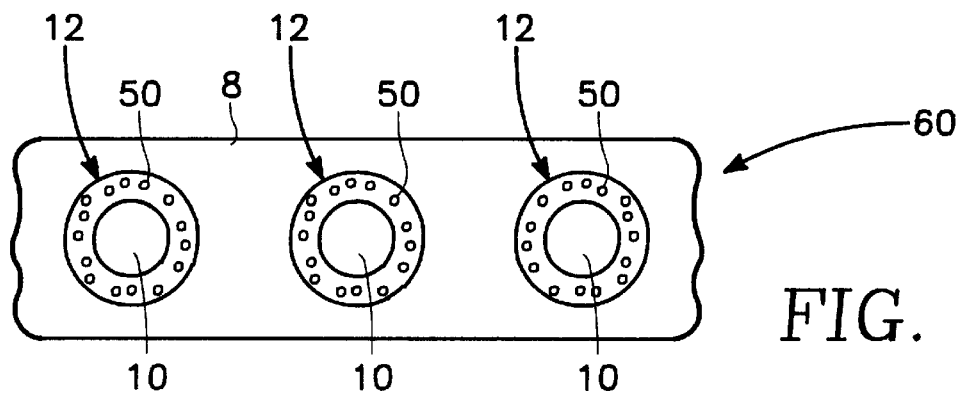
FIG. 6 is a cross-sectional side view of the present invention during one of the processing steps.

Sixth, as shown in FIG. 6, a new (ceramic matrix composite) CMC system 60 is fabricated by combining the fibrous substrate 12 having the coating 50 with a ceramic matrix substrate material 8. Suitable processes for combining the polymeric coating 50 with the ceramic matrix substrate material 8 to fabricate the CMC system 60 are well known to those skilled in the art and will not be described hereinafter in greater detail. The ceramic matrix substrate material 8 preferably has a base matrix material that matches or that is identical or similar to the resin material used for the coating solution.

Figure 7:
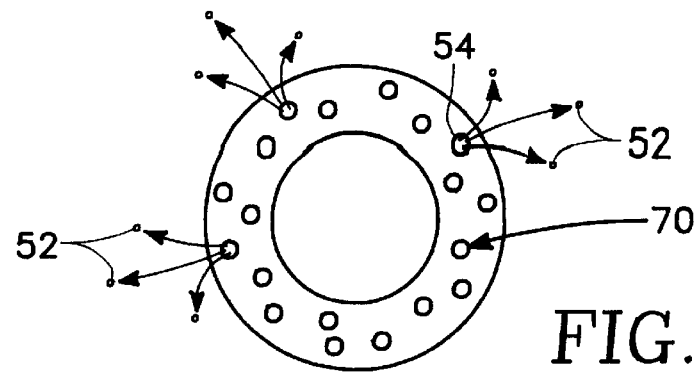
FIG. 7 is a cross-sectional side view of the present invention during one of the processing steps.

Last, referring to FIGS. 1, 5 and 6 along with FIG. 7, the new CMC system 60 is oxidized to remove any carbonaceous particles 52 that exist within the polymeric coating 50 by formation of gaseous $CO_1$ and $CO_2$. This oxidation step creates open pores within the ceramic coating 50, to thereby define a CMC system 60 with a porous interfacial coating 70 surrounding the fibers 10 of the fibrous substrate 12. Specifically, the CMC system 60 can be located within a furnace (not shown) and exposed to high temperatures, such as temperatures greater than 900 degrees F., to oxidize the excess carbonaceous particles 52 within the cured ceramic 54 of the polymeric coating 50, to create a porous ceramic coating. If the particles 52 were carbon particles and the cured ceramic 54 was a siloxane ceramic ($SiO_xC_y$), excess particles would oxidize to $CO_2/CO$ and are therefore forced out of the $SiO_xC_y$ ceramic.

Preferably, the porous interface coating of the present invention will be composed of the same material used for the ceramic matrix of the CMC. This can provide a weak fiber-matrix interface for temperatures greater than 1000° F. The porous interface coating of the present invention, due to its porous nature, will provide a weak fiber-matrix bond, and due to its being composed of the same material as that used for the ceramic matrix, will be effective up to the maximum temperature of the ceramic matrix material. BLACKGLAS ceramic precursor CMCs are preferred due to the relative low cost of the ceramic precursor materials and the ease by which CMC fabrication is possible. BLACKGLAS ceramic precursor matrix material, by virtue of being an oxide-based ceramic ($SiO_xC_y$), is stable to temperatures much higher than 1000° F. in air, and is therefore preferred as the porous interface material. However, any polymeric precursor material for ceramics can be used as long as it can be dissolved within a suitable solvent material.

Working Example

One specific fabrication working example consists of the following steps:

1) Obtain suitable fibrous substrate/fabric material (preferably 10 sheets), such as Nextel 440 aluminosilicate fabric (3.5 inches wide×12 inches long, BF-22 style).

2) Remove any protective fabric sizing preferably via a high temperature heat clean or via immersion in an appropriate solvent.

3) Create coating solution (dual solvent solution) comprising: 1st solution: 5 weight % CREST Phenolic resin in isopropyl alcohol (IPA); and 2nd solution: 5 weight % BLACKGLAS ceramic precursor 489D resin and 0.025 weights BLACKGLAS ceramic precursor 489B catalyst in iso-octane. Combine 250 ml of each solution and mix thoroughly together with a magnetic stirring rod to form a coating solution.

4) Roll fibrous substrates (10 sheets) into a cylindrical geometry and immerse within the coating solution for 1 minute, agitating slightly while immersed to completely wet the fibrous substrate with the coating solution.

5) Evaporate the solvents via room temperature air dry by hanging the coated fibrous substrate (10 sheets) within a fume hood for approximately 15 minutes to volatilize the solvents (IPA and iso-octane).

6) Cure the coated fibrous substrate (10 sheets) in air with the following schedule:
   a) Heat at 10 degrees F./min to 150 degrees F.;
   b) Hold at 150 degrees F. for 1 hour;
   c) Heat at 10 degrees F./min to 350 degrees F.;
   d) Hold at 350 degrees F. for 30 minutes; and
   e) Furnace cool, preferably back to room-temperature.

7) Transfer the coated fibrous substrate (10 sheets) to an oven, such as a high-temperature furnace capable of maintaining an inert atmosphere during processing, and heat it for a time and at a temperature to initiate ceramic formation with the following schedule:
   a) Flow inert gas (such as gas nitrogen or other suitable inert gas) so that it fills the furnace;
   b) Heat at 2.7 degrees F./min to 1600 degrees F.;
   c) Furnace cool, preferably back to room-temperature; and
   d) Release vacuum after cool-down.

8) Fabricate a BLACKGLAS ceramic precursor matrix ceramic matrix composite from the coated fibrous substrate (such as an 8-ply panel) using standard Blackglas fabrication processing techniques. The coating is now an interfacial coating within the Blackglas matrix ceramic matrix composite.

9) Oxidize the BLACKGLAS ceramic precursor matrix ceramic matrix composite to remove excess carbon particles from the interfacial coating to produce a porous interfacial coating. This is achieved by exposing the BLACKGLAS ceramic precursor matrix ceramic matrix composite to greater than or equal to 900° F. degrees F air within a furnace for approximately 10 hours.

This example will produce a coating of approximately 0.1 $\mu$m thick per coating application. Materials fabricated using this working example demonstrated post-oxidation flexure strengths greater than 10 ksi, and failure strains greater than 0.2%. This is a 100% improvement over a BLACKGLAS/NEXTEL 440 ceramic precursor CMC material processed without use of the porous interfacial coating of the present invention (previous flexure strength was 5 ksi and failure strain was 0.1%). It should be noted that the above example uses a dual solvent system (IPA and iso-octane), however, incompatibilities can arise between solvents leading to poor coating results. As such, proper resin, precursor and solvent selection and mixing must be observed.

Applications

The porous interfacial coating 70 creates a CMC with increased ductility, which results in increased flexure strengths and failure strains. In addition, the coating process of the present invention allows for tailorability of the resultant coatings. The amount of porosity within the coating can be varied by altering the resin and precursor concentration ratio. For example, a higher carbon precursor concentration produces a higher resultant porosity after oxidation. Similarly, the coating thickness can be altered by varying the solution concentration. For instance, a higher overall concentration or applying multiple layers will produce a thicker coating.

The coating of the present invention can be used as a fiber/matrix porous interfacial coating to fabricate Blackglas matrix ceramic matrix composite materials for high temperature structures. Nevertheless, the porous interfacial coating can be used to fabricate many CMC's to significantly improve the high temperature mechanical properties over CMCs fabricated without the porous interfacial coating.

For example, the porous coatings of the present invention can be used to produce CMCs that will be mechanically viable at temperatures greater than 1000° F. for long service lives. These CMCs can be used for applications with temperatures above which boron nitride is viable, such as protective CMC layers for graphite stirring rods used in the molten metal industry, high temperature exhaust liners for missiles and aircraft, and/or ceramic brakes for land vehicles and aircraft, as well as other suitable applications.

Also, the porous interfacial coating of the present invention can be applied to ceramic matrix composite parts (of most sizes limited only by the size of the furnace and immersion bath) in a cost effective manner. Any fibrous substrate with a surface that is non-reactive with the coating constituents and can withstand the processing steps can be coated using the process embodied in the present invention.

However, even lower temperature fibers, such as fiberglass, can be carbon fiber-coated in accordance with the present invention, for example, by lowering the pyrolysis temperature. For example, the low-cost process embodied in the present invention can be used for the application of porous interfacial coatings as a fiber-matrix interfacial coating for low-cost glass-matrix CMC materials.

An advantage of the present invention is that coating uniformity is enhanced over CVD coating due to the complete immersion of the fibrous substrate during the solution coating process. Also, the low cost of raw materials, low labor intensity, and elimination of the need for expensive CVD equipment (limited only to the size of the inert pyrolysis furnace and immersion bath) provides a superior coating process.

It should be noted that the above is an example set of steps for fabricating the porous interfacial coating of the present invention. Other processes with modified steps suitable for effective fabrication can be used as long as no damage occurs to either the coating solution or the fibrous substrate.

Accordingly, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A ceramic matrix composite comprising a fibrous substrate and a porous interfacial coating surrounding each fiber of said fibrous substrate, said ceramic matrix composite derived by: (a) desizing said fibrous substrate, (b) immersing said desized fibrous substrate in a coating solution, said coating solution comprising resin and ceramic precursor having carbon particulate and dissolved directly within a solvent, (c) evaporating said solvent and curing said resin to produce a polymeric interfacial coating around each fiber of said fibrous substrate, (d) pyrolyzing said polymeric coating, (e) combining said fibrous substrate having said ceramic coating with a ceramic matrix material to produce a ceramic matrix composite system, and (f) removing by oxidation said carbon particulate by oxidizing said ceramic matrix composite system to thereby form respective pores in place of said particulate in said interfacial coating.

2. The invention as set forth in claim 1, wherein said polymeric coating around said fibrous substrate is pyrolyzed via a high temperature pyrolysis in an inert atmosphere.

3. The invention as set forth in claim 1, wherein said fibrous substrate is a fiber fabric sheet, a tow material, or a combination of a fiber fabric sheet and a tow material.

4. The invention as set forth in claim 1, wherein said evaporating said solvent and curing said precursor via a low temperature cure step is performed to produce a uniformly thick polymeric coating around each said fiber.

5. The invention as set forth in claim 1, wherein said fibrous substrate is composed of ceramic fibers.

6. The invention as set forth in claim 1, wherein said fibrous substrate is one of fiberglass, quartz, and oxidebased ceramic fabric.

7. The invention as set forth in claim 1, wherein said pyrolyzing said polymeric coating around said fibrous substrate via a high temperature pyrolysis step comprises:
   (a) heating said polymeric coating around said fibrous substrate to form a cured carbon-containing ceramic coating;
   (b) heating said polymeric coating around said fibrous substrate in an inert atmosphere to form a carbon-containing ceramic coating without damaging the fibrous substrate;
   (c) cooling said coating around said fibrous substrate; and
   (d) keeping said coating around said fibrous substrate within an inert atmosphere until the temperature decreases to room temperature.

8. The invention as set forth in claim 1, wherein said coating solution is comprised of a dual solvent solution.

9. A method of producing a porous interfacial fiber coating, comprising the steps of:
   (a) providing a fibrous substrate/fabric material;
   (b) removing protective fabric sizing;
   (c) immersing said fibrous substrate in a solution comprising resin and ceramic precursor having carbon particulate so as to coat said fibrous substrate with said solution;
   (d) evaporating said solvent and curing said resin to produce a polymeric coated fibrous substrate made of a polymeric coating around each fiber of said fibrous substrate;
   (e) pyrolyzing said polymeric coating around each fiber of said fibrous substrate; and
   (f) removing by oxidation said carbon particulate by oxidizing said resultant ceramic coating to thereby form respective pores in place of said particulate in said interfacial coating.

10. The method of claim 9, further comprising, after step (e), the step of successively repeating steps (c)–(d) until a desired thickness of the carbon coating around said fibrous substrate is achieved.

11. The method of claim 10, wherein said curing said resin comprises curing said coating in air via a low temperature cure.

12. The method of claim 10, wherein said pyrolyzing said polymeric coating around said fibrous substrate comprises placing said polymeric coated fibrous substrate within a high-temperature furnace capable of maintaining an inert atmosphere during processing, flowing a suitable inert gas so as to fill said furnace, heating said polymeric coated fibrous substrate at for a time and at a temperature without damaging the fibrous substrate, cooling said furnace at a programmed rate.

13. The method of claim 10, wherein said removing said protective fabric sizing is comprised of high temperature heat cleaning said fibrous substrate/fabric material.

14. The method of claim 10, wherein said removing said protective fabric sizing is comprised of immersing said fibrous substrate/fabric material in an appropriate solvent.

* * * * *